(12) United States Patent  (10) Patent No.: US 7,959,139 B2
Fukui et al.  (45) Date of Patent: Jun. 14, 2011

(54) NONCONTACT ROTATING PROCESSOR

(75) Inventors: Satoshi Fukui, Niigata (JP); Jun Ogawa, Niigata (JP); Mitsugi Yamaguchi, Niigata (JP); Tetsuo Oka, Niigata (JP); Tomoe Sasahara, Saitama (JP); Shinsuke Miyazaki, Saitama (JP)

(73) Assignees: Niigata University, Niigata-shi (JP); MTC Co., Ltd., Saitama-shi (JP)

( * ) Notice: Subject to any disclaimer, the term of this patent is extended or adjusted under 35 U.S.C. 154(b) by 440 days.

(21) Appl. No.: 12/086,481

(22) PCT Filed: Nov. 21, 2006

(86) PCT No.: PCT/JP2006/323250
§ 371 (c)(1),
(2), (4) Date: Jun. 13, 2008

(87) PCT Pub. No.: WO2007/069433
PCT Pub. Date: Jun. 21, 2007

(65) Prior Publication Data
US 2010/0289200 A1  Nov. 18, 2010

(30) Foreign Application Priority Data

Dec. 16, 2005 (JP) ................................. 2005-363665
Dec. 16, 2005 (JP) ................................. 2005-363676
Sep. 22, 2006 (JP) ................................. 2006-257304

(51) Int. Cl.
B25B 11/00 (2006.01)

(52) U.S. Cl. .............. 269/8; 269/74; 29/281.1; 451/385
(58) Field of Classification Search ............... 269/8, 74, 269/28 R, 903; 29/281.1; 451/285, 385
See application file for complete search history.

(56) References Cited

U.S. PATENT DOCUMENTS 5,831,362 A * 11/1998 Chu et al. ..................... 310/90.5
6,965,288 B2 * 11/2005 Terentiev ..................... 335/216

FOREIGN PATENT DOCUMENTS

| JP | 57150815 A | * | 9/1982 |
| JP | 08-296648 A | | 11/1996 |
| JP | 2002-005265 A | | 1/2002 |
| JP | 2002-239443 A | | 8/2002 |
| JP | 2003-126755 A | | 5/2003 |
| JP | 2004071794 A | * | 3/2004 |
| WO | 02/31372 A1 | | 4/2002 |

* cited by examiner

Primary Examiner — George Nguyen
(74) Attorney, Agent, or Firm — Kubovcik & Kubovcik

(57) ABSTRACT

Provided is a noncontact apparatus for performing rotating process to a subject to be processed, without contaminating environment in an airtight container. A spin head (1) is held on a holder (7) in an airtight container, a pinning force is generated between the spin head (1) and a Type-II superconductor (11), and the spin head 1 is floated by lifting the Type-II superconductor (11) by a lifting means (22). Then, rotating force generated by a noncontact rotating power transmitting body (18) arranged in the internal center of the Type-II superconductor (11) is subsequently generated on the side of the spin head (1) and the spin head (1) is rotated in conjunction with a driving motor (19).

11 Claims, 13 Drawing Sheets airtight container inside airtight container outside

NONCONTACT ROTATING PROCESSOR

TECHNICAL FIELD

The present invention relates to an apparatus applicable to: an apparatus that rotates a thin plate material such as a substrate (a wafer) in a noncontact state (a floating state) in production of a semiconductor, a liquid crystal, or the like so as to form a thin film on a surface of the thin plate material, or to clean or dry the surface; a separator that separates a fine substance from a liquid by high-speed rotation; and the like.

BACKGROUND ART

In production of semiconductors, liquid crystals, and the like, there is an operation step in which a thin film is formed on a surface of a substrate (a subject to be processed) such as a wafer or a glass plate, or the surface is cleaned or dried. In the operation step, there is used an apparatus that rotates a substrate mounted on a rotary head at a high speed.

For example, in a thin film forming step, an apparatus called a spin coater is used, which rotates at a high speed a substrate having a coating solution dropped thereon, so as to spread the coating solution by centrifugal force, thereby forming a thin film.

As shown in FIG. 9, a structure of a conventional spin coater mainly includes: a discoidal spin head 50 (a rotary head) placed horizontally; a rotating shaft 52 extending downward from the center of a lower surface of the spin head 50; and a driving motor 51 connected to the spin head 50 through the rotating shaft 52. A wafer 53 is mounted on an upper surface of the spin head 50, while a splash-preventing cup 56 is disposed around the wafer 53 so as to cover the entire spin head 50. An upper surface of the splash-preventing cup 56 is open, while a discharge nozzle 55 is placed above the splash-preventing cup 56 in order to supply a coating solution 54 (a processing solution) in a droplet form.

First, the wafer 53 conveyed from a previous step is automatically conveyed and mounted on the spin head 50 by a suction conveyor or the like, and then the wafer 53 is rotated at a high rotation speed (e.g., 4000 rpm, or the like) together with the spin head 50 by using the driving motor 51 through the rotating shaft 52. Next, when the coating solution 54 is dropped onto a surface of the rotating wafer 53 from the nozzle 55, the coating solution 54 spreads on the surface of wafer 53 by centrifugal force to form a thin film. It should be noted that, the excessive coating solution 54 not having contributed to the formation of the thin film is collected by the splash-preventing cup 55 and recovered from the lower part.

A thin film forming step by such a spin coater is performed in an airtight container 58 in a clean environment in order to prevent impurities from mixing into a thin film. Hence, with the rotating shaft 52 being set as a border, a spin coater is usually configured such that the upper part including the spin head 50 is arranged in the airtight container 58, and that the lower part including the driving motor 51 is arranged outside the container 58. With this configuration, since the rotating shaft 52 penetrates though a floor wall 58a of the airtight container 58 in a conventional spin coater, a part penetrated by the rotating shaft 52 is provided with a seal material 57 for maintaining a clean environment in the airtight container.

DISCLOSURE OF THE INVENTION

However, in a conventional spin coater (i.e., a subject to be processed such as a semiconductor), there has been a problem. Specifically, in the conventional spin coater, there is adopted a mechanism in which the rotating shaft 52 is in contact with the seal material 57 and sealed. For this reason, this part in contact is abraded to generate fine particle-shaped foreign materials, and thus contaminate a clean environment in the airtight container 58. As a result, since the clean environment cannot be completely maintained, reduction in quality of wafers occurs after processing.

Furthermore, there has been another problem. Specifically, when maintenance and repair/replacement of the drive motor 51 or the like is to be performed, since the spin head 50 and the rotating shaft 52 must be removed therefrom, a thin film forming operation in the airtight container 58 is interrupted for a long period of time. As a result, the yield of substrate processing is reduced.

The present invention has been made to solve a pollution problem of an environment in which a subject to be processed as mentioned above is processed. A first object of the present invention is to provide: an apparatus in which maintenance and repair/replacement can be easily performed, a substrate is securely supported, and rotation processing can be performed without contaminating a clean environment in an airtight container; and a separator or the like to which a rotation mechanism thereof is applied.

Recently, there has been a need to manufacture a large number of semiconductor devices from one substrate and produce an inexpensive device, so that large diameter substrates have come to be manufactured. There has been another need to preferably process both a front and a back surface of a substrate by using the same device; however, there has not yet been conventionally proposed an apparatus that is suitable for the application of processing both the surfaces without performing an operation such as a turnover of a substrate.

A second object of the present invention is to provide an apparatus: that can process at the same time or continuously both a front and a back surface of a subject to be processed such as a semiconductor substrate by using the same apparatus; and that can precisely rotate and stop a spin head that supports the subject to be processed.

1) The invention of a noncontact rotating processor according to claim 1 for attaining the above described object is a noncontact rotating processor characterized by comprising:

a container;

a discoidal rotary head part that rotates with a subject to be processed mounted thereon, and that is accommodated in the container;

means for magnetically transmitting rotating power, the means being arranged below the container so as to be opposite to the rotary head part in non-contact therewith; and a magnetically fixing part which concentrically encloses the transmission means for transmitting the rotating power, and which magnetically positions the rotary head part in a predetermined position thereabove, the noncontact rotating processor characterized in that the rotary head part includes: a magnetically receiving means which receives rotating force; and a ring-shaped permanent magnet concentrically enclosing the magnetically receiving means, and the magnetically fixing part includes: a pinning member formed of a Type-II superconductor concentrically arranged opposite to the ring-shaped permanent magnet; and cooling means for cooling the pinning member, and further, is provided with lifting means for lifting the pinning members.

2) The invention according to claim 2 is characterized in that a holder that holds the rotary head part is disposed on the inner face of the floor wall of the container.

3) The invention according to claim 3 is characterized in that a gap large enough only to allow magnetically driving means to rotate is formed between the transmission means for transmitting the rotating power and the upper face of the container, in a state where the bottom face of the container is in contact with the upper face of a container constituting the magnetically fixing part.

4) The invention according to claim 4 is characterized by comprising:

a container;

a discoidal rotary head part that rotates with a subject to be processed mounted thereon and has an opening in its central part, the discoidal rotary head part being accommodated in the container;

a floating permanent magnet disposed on the lower face of the rotary head part;

one of a rotating permanent magnet and a ferromagnetic steel plate that is disposed on any one of the outer periphery, and the lower face of the inner peripheral side, of the magnet;

a Type-II superconductor circularly arranged in a position opposite to the floating permanent magnet; and means for magnetically transmitting rotating power arranged in a position opposite to the one of the rotating permanent magnet and the ferromagnetic steel plate in non-contact therewith, the noncontact rotating processor characterized in that the rotary head part is rotationally driven in a non-contact state.

5) The invention according to claim 5 is characterized by comprising:

a container;

a discoidal rotary head part that rotates with a subject to be processed mounted thereon and has an opening in its central part, the discoidal rotary head part being accommodated in the container;

a floating permanent magnet that is disposed on the lower face of the rotary head part as well as one of a rotating permanent magnet and a ferromagnetic steel plate that is disposed on both faces of an outer peripheral part of the permanent magnet and an upper face corresponding to the outer peripheral part;

a rotating magnetic field coil that is arranged to pinch, from above and below, the one of the rotating permanent magnet and the ferromagnetic steel plate;

a Type-II superconductor circularly arranged so as to correspond to the floating permanent magnet, the noncontact rotating processor characterized in that the rotary head part is rotationally driven in a non-contact state by: the one of the permanent magnet and the ferromagnetic steel plate disposed on both faces of the outer periphery of the rotary head part; and the rotating magnetic field coil disposed so as to correspond to the one of the permanent magnet and the ferromagnetic steel plate.

6) The invention according to claim 6 is characterized in that a part of the outer periphery of the container is circularly swollen, an outer peripheral part of the rotary head part having an opening in the central part is arranged in the swollen part, and the rotating magnetic field coil is arranged so as to pinch the swollen part from above and below.

7) The invention according to claim 7 is characterized by comprising:

a container;

a discoidal rotary head part that rotates with a subject to be processed mounted thereon and has an opening in its central part, the discoidal rotary head being accommodated in the container;

a floating permanent magnet disposed on the lower face of the head part;

one of a rotating permanent magnet and a ferromagnetic steel plate disposed on the outer peripheral side of the rotary head part;

a rotating magnetic field coil arranged on the bottom part of the container in a position opposite to the one of the magnet and the ferromagnetic steel plate, the noncontact rotating processor characterized in that the rotary head is rotationally driven by means of the one of the permanent magnet and the ferromagnetic steel plate.

8) The invention according to claim 8 is characterized by comprising:

a moving device; and a plurality of the noncontact rotating processors according to any one of claims 1 to 6 arranged on the moving device, the continuous noncontact rotating processor characterized in that the moving device is moved and then stopped at a predetermined position, and thereafter, a plurality of processes are sequentially implemented at the stop position.

According to a noncontact rotating processor of the present invention, a rotation operation for a rotary head part, which is placed in a container (a container capable of being airtight), is performed from the outside of the container without affecting an environment in the container. This operation is performed by floating a rotary head part with magnetic "pinning force" generated between a rotary head part and a Type-II superconductor, and thus by rotating the floated rotary head part with a noncontact rotating power transmitting body, thereby making it possible to form a thin film while a clean environment in an airtight container is maintained. Thus, it is possible to improve the quality of a subject to be processed such as a thin plate-like material, particularly a semiconductor substrate.

In addition, the rotary head part in the airtight container does not have a driving part such as a driving shaft. For this reason, maintenance and repair are rarely required, and parts outside the container for floating and rotating the rotary head part can be integrally configured. Accordingly, a rotating processor for a subject to be processed such as a semiconductor substrate is miniaturized and easily arranged in a production line, and also the maintenance and repair/replacement of the rotating processor can be easily carried out without interrupting an operation in the container for a long period of time. Thus, it is possible to improve the yields of various processes of a subject to be processed such as a semiconductor substrate.

Moreover, efficient processing of a thin plate-like subject to be processed such as a semiconductor substrate can be achieved by smoothly delivering a subject to be processed as a substrate through a robot arm or the like.

BEST MODES FOR CARRYING OUT THE INVENTION

Example 1

A first embodiment of the present invention will be described with reference to drawings (FIGS. 1 to 6).

Herein, one rotating processor, a so-called "spin coater," will be explained as an example. The spin coater processes a thin plate-like material such as a semiconductor substrate as a subject to be processed that is subjected to rotation processing.

Figure 1:
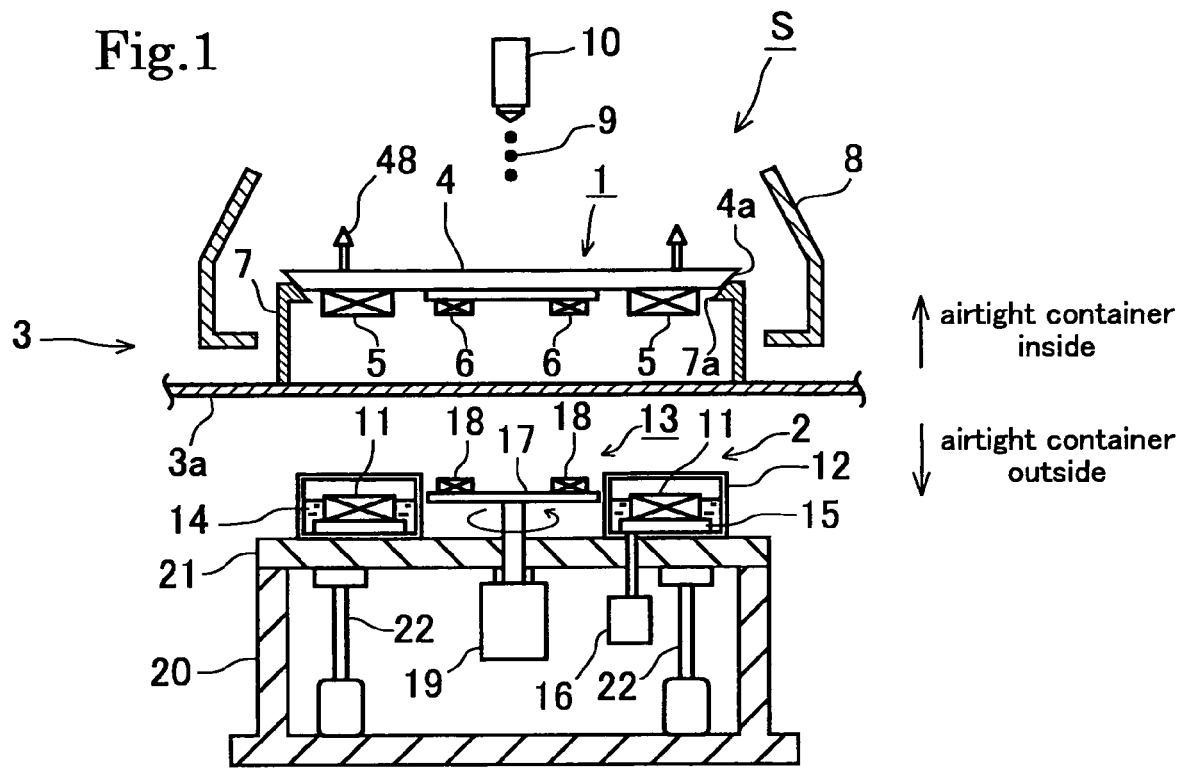
FIG. 1 is a sectional view of a noncontact rotating processor according to the present invention.

FIG. 1 is sectional view of a first embodiment of a spin coater S according to the present invention, which mainly includes: a rotary head part 1 that rotates in a container 3 (a container capable of being airtight that is separated above and below); and a fixing part 2 that drives and operates the rotary head part 1 in a noncontact manner from below the airtight container 3, with a floor wall 3a interposed therebetween.

The above rotary head part 1 includes: a discoidal table 4 made of a nonmagnetic material having implanted therein multiple holding pins 48 on which an unillustrated substrate is to be mounted; and a ring-shaped permanent magnet 5; and a magnetic rotating power passive body 6 serving as a noncontact rotating force passive means. Both of the ring-shaped permanent magnet 5 and the magnetic rotating power passive body 6 are arranged on the bottom face side of the table. Below the spin head part 1, multiple holders 7 for holding the spin head part 1, while the rotation thereof is stopped, are implanted in the floor wall 3a. In addition, an outer peripheral part 4a of the table 4 and an end 7a of the holder 7 in contact with the outer peripheral part 4a are inclined and when the rotary head part 1 is mounted on the holder 7, the central shaft of the rotary head part 1 is made to be always kept at a constant position.

Moreover, around the rotary head part 1 and the holder 7, a cylindrical splash-preventing cup 8 with the upper face open is arranged, and above the rotary head 1 is disposed a discharge nozzle 10 from which a coating solution 9 is dropped.

Figure 2:
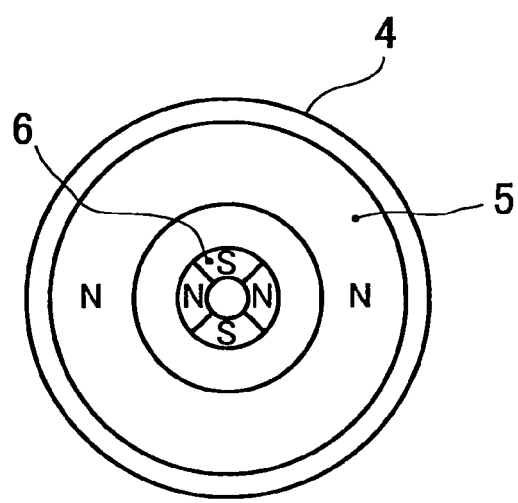
FIG. 2 is a bottom view of a rotary head part of a noncontact rotating processor according to the present invention.

A bottom view of the rotary head part 1 is shown in FIG. 2, and in the central part is arranged in a ring form multiple permanent magnets making up a magnetic rotating passive body 6; the polarities of this series of magnets are expressed by "N" and "S." Additionally, the ring-shaped permanent magnet 5 for magnetic floating and the rotating power passive body 6 are concentrically arranged on the bottom face of the table 4.

The ring-shaped permanent magnet 5 arranged on the outer peripheral side of the back face of the table 4 is magnetized such that the polarity appearing on the surface becomes either "N" or "S." In addition, the rotating power passive body 6 arranged on the inner peripheral side includes multiple permanent magnets arranged such that the polarities appearing on the surface are alternately changed in the circumferential direction. It should be noted that, in FIG. 2, although a configuration of four permanent magnets is illustrated as an example, the number of the magnets arranged in an actual device is larger than four.

(Fixing Part 2)

Figure 3:
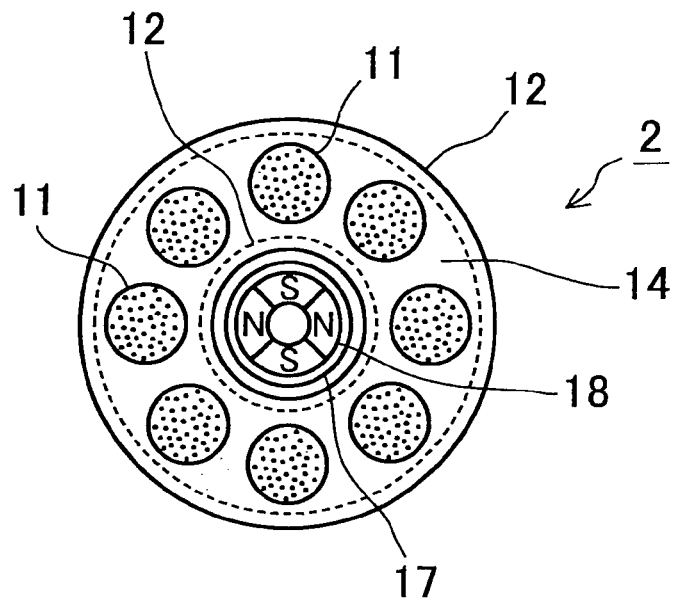
FIG. 3 is a top view of a pinning means of a noncontact rotating processor according to the present invention.

The fixing part 2 includes means for magnetically positioning the above rotary head 1 in the height direction at a predetermined position in the container 3, noncontact type driving means for imparting rotation and stopping forces to the rotary head 1, and the like. As illustrated in FIG. 3, these devices mainly include: a Type-II superconductor 11; an adiabatic container 12; a rotationally driving part 13; and the like.

(Pinning Effect and Pinning Member)

As known, the superconductor uses the Type-II superconductor and this component is a superconductor having yttrium 123 as a main component and has a property disliking magnetic fields, and this property is called the Meissner effect. As a superconductor is cooled by using liquid nitrogen, it generates the effect of repelling a magnet and floating it. Additionally, as this superconductor is slightly strongly pushed against a magnet, the magnet is then stabilized to generate a floating action, which is referred to as a "pinning effect."

The present invention makes use of a "pinning effect" in which a superconductor captures a magnetic flux generated from a permanent magnet produced by the superconductor and which maintains the distance between the permanent magnet and the superconductor; the effect keeps the distance between a fixing part arranged in the superconductor and a permanent magnet disposed in a rotary head part supporting a subject to be processed arranged above it in a noncontact fashion at a predetermined position; that is to say, the invention utilizes the action of holding a material in a predetermined space.

Causing the pinning effect to act on a rotary head part makes it possible to drive the rotary head part by imparting a small rotating force to the rotary head part, because the rotary head part is floated in the air without using any physical means.

In this manner, if a rotary head part can be rotated in a noncontact fashion in an airtight container, various processes are made possible in no dust environment, so that a separation operation can also be carried out without dispersing microbes or the like outside in micro-processing like the micro-processing of semiconductor devices or in an isolated environment.

The Type-II superconductor 11 (FIG. 3) constituting a pinning member is housed, in the ring-shaped hollow adiabatic container 12 (FIG. 12) serving as its cooling means, in a state of being immersed in, for example, liquid nitrogen or liquid helium serving as a cooling material 14. In this example, the adiabatic container 12 has a dual structure, and rendering the space between two partition walls in an almost vacuumed state offers a thermos-like adiabatic effect.

In addition, between the bottom face of the Type-II superconductor and the adiabatic container 12, a material excellent in thermal conductivity, for example, a heat transfer plate 15 made of copper is placed, so that the cooling material 14 is cooled by a cooler 16 disposed in the lower part through the heat transfer plate 15 (receives a supply of cooling by a freezer).

Additionally, the rotationally driving part 13 includes a discoidal metal plate 17 and a rotating power transmitting body 18 (a permanent magnet) serving as a noncontact type rotating power transmitting body arranged on its upper face, and is connected to a driving motor 19 arranged below. It should be noted that, this driving motor 19 desirably uses a motor with a brake in terms of the function of a spin coater that frequently repeats rotation and stop.

(Mechanism Generating Pinning Effect)

The adiabatic container 12 and the driving motor 19 as illustrated in FIG. 1 are fixed to an upper part 21 of a supporting base 20 and this upper part 21 can be moved up and down by lifting means 22, for example, an air cylinder or a servomotor.

FIG. 3 is a top view of the fixing part 2 configured of a superconductor and the indication of the polarity of the permanent magnet is as in FIG. 2. The Type-II superconductor 11 is a cylindrical bulk body and the multiple superconductors are concentrically arranged in the adiabatic container 12 so as to be opposite to a ring-shaped permanent magnet 5 arranged in the rotary head part 1. The size of the inner and outer diameters of a concentric circle made by the multiple Type-II superconductors 11 are preferably made to be larger than the inner and outer diameters of the opposing ring-shaped permanent magnet 5 from the viewpoint of stably floating the rotary head part 1.

The material of this Type-II superconductor 11 desirably includes an yttrium-based (Y—Ba—Cu—O), gadolinium-based (Ga—Ba—Cu—O), neodymium-based (Nd—Ba—Cu—O) or europium-based (Eu—Ba—Cu—O) oxide.

It should be noted that, the shape and arrangement of the Type-II superconductor 11 are not particularly limited to the structure shown in FIG. 3 so long as they have a pinning effect on the ring-shaped permanent magnet 5 disposed on the lower face of the rotary head part 1.

The rotationally driving part 13 is arranged to be positioned inside the adiabatic container 12; whereas, the rotating power transmitting body 18 is arranged on the metal plate 17 so as to be opposite to the rotating power passive body 6 of the rotary head part 1.

This rotating power transmitting body 18 includes a permanent magnet arranged such that its polarity is alternately changed in the circumferential direction in the same manner as the rotating power passive body 6, and is preferably made to be the same specification as that of the rotating power passive body 6 from the viewpoints of an increase in magnetic sucking force and rationalization of manufacturing costs.

In this way, the Type-II superconductor 11, the adiabatic container 12, and the rotationally driving part 13 have a simple structure and also are integrally configured.

(Performance Principle of Spin Coater)

Before the performance of a spin coater configured as described above is explained, the principles of the floating and rotation of a rotary head part is described with reference to FIG. 4, and this FIG. 4 is a schematic diagram indicating the relationship between a ring-shaped permanent magnet of a rotary head part and a Type-II superconductor of a fixed part.

Figure 4A:
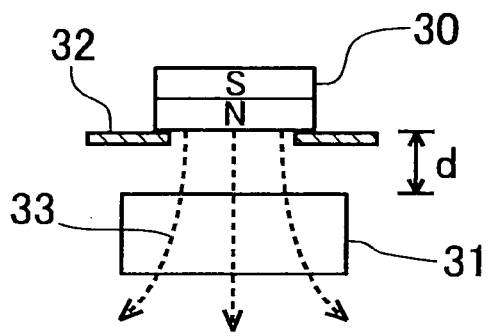
FIGS. 4(a) to 4(d) are schematic diagrams indicating the principle of magnetic floating.

First, as in FIG. 4(a), a permanent magnet 30 having a symmetrical shape in the horizontal direction (corresponding to the ring-shaped permanent magnet 5 of the rotary head part 1) is held by restraining means 32 by a predetermined distance d away upward from a similarly symmetrical Type-II superconductor 31 (corresponding to the Type-II superconductor 11 of the fixing part 2). It should be noted that, the permanent magnet 30 is magnetized in its N pole to be opposite to the Type-II superconductor 31. In this state, a magnetic flux 33 generated from the permanent magnet 30 simply passes through the inside of the Type-II superconductor 31.

Figure 4B:
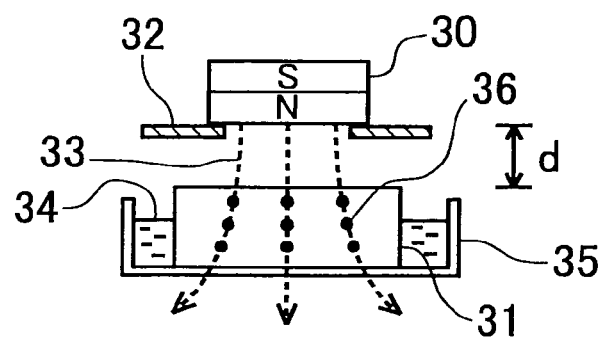

Next, as in FIG. 4(b), the Type-II superconductor 31 is immersed in, or the like, liquid nitrogen 34 to be thereby cooled to the critical temperature or lower. In the Type-II superconductor 31 in a superconducting state, the magnetic flux 33 from the permanent magnet 30 is quantized and a pinning effect 36 is generated in which the magnetic flux is captured and held as if it were pinned to a normal conducting state existing inside. At this time, the potential energy of a system including the permanent magnet 30 and the Type-II superconductor 31 is in a stable state.

Figure 4C:
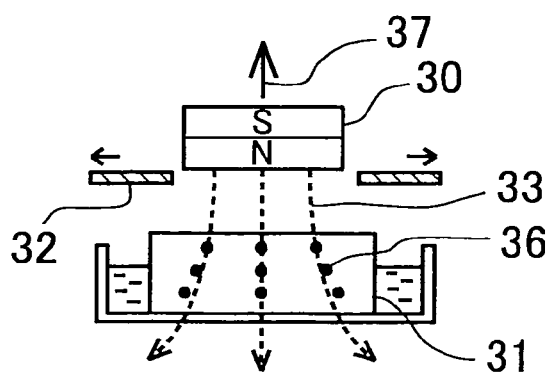

When the restraining means 32 of the permanent magnet 30 is released, as in FIG. 4(c), from such a state, the permanent magnet 30 drops by gravity toward the Type-II superconductor 31, so that the distance d between both of them becomes small. This means that the magnetic flux 33 is deviated from a pinned position 36 to unstabilize the potential energy of the system. Because of this, a pinning force 37 is generated in a direction of stabilizing the potential energy, that is, in the axis direction inverse to the gravity. Thus, the permanent magnet 30 is floated at the position by the distance d away from the Type-II superconductor 31.

Figure 4D:
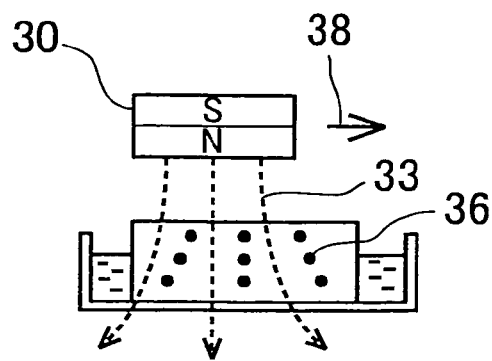

This pinning effect is similarly generated in the case where the permanent magnet 30 is moved in the horizontal direction as in FIG. 4(d), and a pinning force 38 is generated in the diameter direction in which the potential energy of the system is stabilized.

It should be noted that, the above-mentioned predetermined distance d is uniquely determined from the shapes of the permanent magnet 30 and the Type-II superconductor 36, the strength of the magnetic force of the permanent magnet 30, and the like.

Next, a method of rotating a permanent magnet floating over a Type-II superconductor will described in detail with reference to FIG. 5. This figure is a schematic diagram indicating permanent magnets disposed on the lower face of a rotary head part and the relation of the positions between a Type-II superconductor of a fixing part and the permanent magnet, and the same parts as in FIG. 1 are denoted by the same reference numerals.

The rotary head part 1, from the principle described above, is floated above the fixing part 2 since a magnetic flux 40 from the ring-shaped permanent magnet 5 is pinned in the second kind super conductor 11. At this time, the rotating power passive body 6 and the rotating power transmitting body 18 opposite to each other include a permanent magnet in which the polarity is arranged to alternately change in the circumferential direction, so that the metal plate 17 having arranged thereon the rotating power transmitting body 18 is suitably rotated to make different polarities be opposite to each other. Thus, it is possible to generate a magnetic sucking force 41 therebetween. In this state, the rotation of the rotationally driving part 13 by the driving motor 19 enables the rotary head part 1 floating by the pinning effect to be rotated in conjunction therewith through the magnetic sucking force 41.

Here, the rotating power passive body 6 and the rotating power transmitting body 18 are configured of a permanent magnet arranged such that the polarity alternately changes in the circumferential direction. Thus, it is possible to effectively use the magnetic sucking force of a permanent magnet for rotation, as compared with the case of single polarity.

At this time, although the magnetic flux 40 from the ring-shaped permanent magnet 5 captured by the Type-II superconductor 11 is also moved in the circumferential direction, these ring-shaped permanent magnet 5 and Type-II superconductor 11 have a symmetrical shape in the horizontal direction, so that the potential energy of the system does not change, thereby not affecting the rotation of the rotating head part 1.

It should be noted that, for some reason, if the rotary head part 1 deviates in the axis direction or the diameter direction, as described with reference to the FIG. 4, the pinning force is generated so as to return the rotary head to the original position, thereby stably maintaining the rotation state.

(Description of Performance of Spin Coater)

In consideration of the performance principle so far, the performance of a spin coater S according to the present invention will be described below with reference to FIG. 6. FIG. 6 is an explanation diagram indicating a flow of the performance of the spin coater S, and the same parts as in the FIG. 1 are denoted by the same reference numerals.

First of all, as a standby state, the rotary head part 1 is held on the holder 7 fixed on the bottom wall 3a of the airtight container 3. Then the fixing part 2 of being a lower part mechanism is arranged by a predetermined distance downward away from the rotary head part 1. Here, a "predetermined distance" corresponds to the "distance d" indicated by the FIG. 4. Subsequently, the Type-II superconductor 11 of the adiabatic container 12 is cooled to the critical temperature or lower by a freezer 16 to render the above Type-II superconductor 11 in a superconducting state.

Figure 6A:
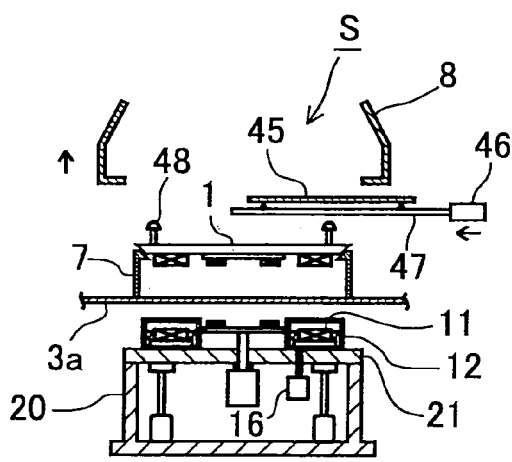
FIGS. 6(a) to 6(d) are operation explaining diagrams of a noncontact rotating processor according to the present invention.

Next, the splash-preventing cup 8 is moved upward and a substrate 45 (a subject to be processed) mounted on a fork part 47 of a robot arm 46 is moved upward of the rotary head 1 (refer to FIG. 6(a).

Figure 6B:
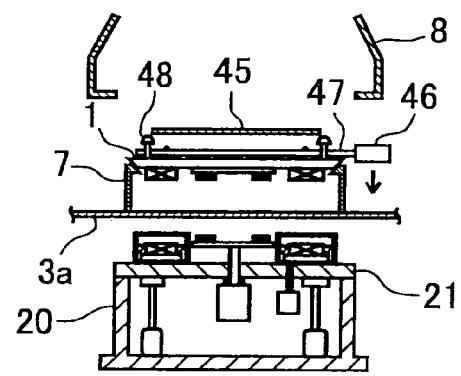

After the substrate 45 (a subject to be processed) is moved to a predetermined position above the rotary head part 1, the robot arm 46 is brought down and delivers the substrate 45 to a holding pin 48 acting as a protruded part installed on the rotary pinhead part 1 (FIG. 6(b). This holding pin 48 has been provided with a cone-shaped silicone rubber in its edge and holds the substrate on the rotary head 1 so as to pinch it with the inclined face of the silicone rubber from the outer periphery.

The above holding pin 48 is effective for performing surface processing while holding by point contact the periphery of the discoidal thin plate-like substrate 45 and rotating at a high speed. However, it is possible to adopt any means, as long as the means is capable of temporarily holding the periphery or the like of a subject to be processed if not by the point contact. For example, it is possible to adopt a holding part using a part of a cone face of something like a dish, or means that is capable of holding the periphery or the like by engaging with a concave or a convex of the bottom face of a subject to be processed. Moreover, a device holding a plate-like material or the like can also be used.

Figure 6C:
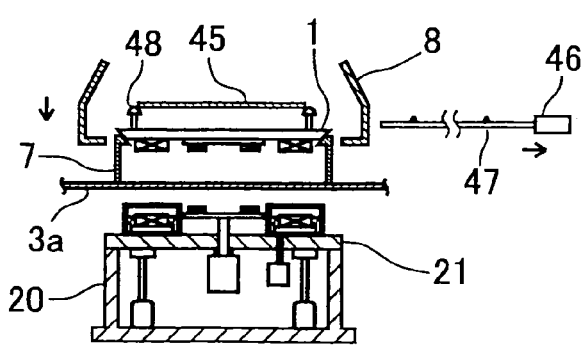
Figure 6D:
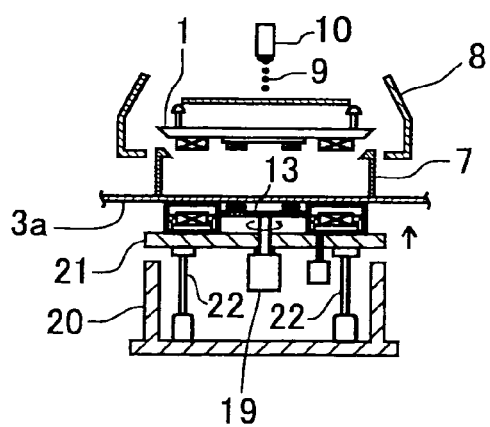

After delivery of the substrate 45 by the above operation, the robot arm 46 is pulled out in the horizontal direction and the splash-preventing cup 8 is brought down to the original position (FIG. 6(c)).

After the substrate 45 is mounted on the rotary head part 1 as described above, the lifting means 22 is used to lift the upper part 21 of the supporting base 20, whereby the rotary head part 1 is floated to a height by a predetermined distance away from the holder 7. Then, the substrate 23(45) together with the rotary head part 1 is rotated at a high speed by the driving motor 19 through the rotationally driving part 13. Thereafter, when the coating solution 9 is dropped onto the surface of the rotating substrate 23(45) from the above-placed discharge nozzle 10 (FIG. 1), the coating solution 9 is spread to the surface of substrate 45 by centrifugal force to form a thin film. The excessive coating solution 9 that has not been used to form the thin film is collided against the splash-preventing cup 8 and collected, and then recovered from the lower part (FIG. 6(d)).

After the thin film has been formed on the substrate 45 surface, the rotation of the rotary head 1 is stopped by stopping the driving motor 19. Then, the upper face 21 of the supporting base 20 is brought down by the operation of the lifting means 22 so as to hold the rotary head part 1 on the holder 7. Finally, the substrate 45 is taken out of the surface of the rotary head 1 by the robot arm 46 in a procedure inverse to the above and then conveyed to a next processing step.

(Description of Effects)

In this manner, the rotary head part 1 accommodated in the container 3 capable of being airtight (supporter of a subject to be processed) does not have a part directly driving, so that there is almost no need for carrying out maintenance or repair. In addition, the fixing part 2 of the lower part of the airtight container 3 having a driving part has a simple structure and is integrally configured, thereby being capable of being miniaturized and also easily maintained and repaired/replaced.

Additionally, once the Type-II superconductor 11 is made in a superconducting state, maintaining the superconducting state, while the rotating device is stopped, is rational and there is no unnecessary operation.

Example 2

Figure 7:
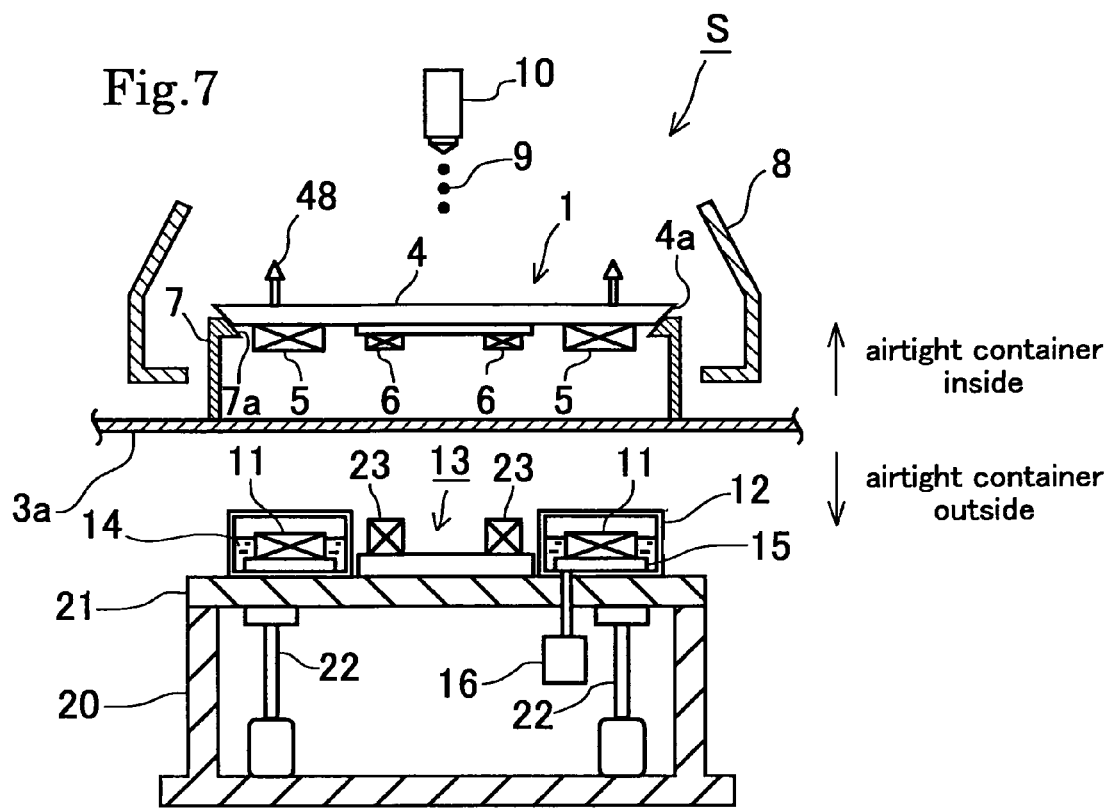
FIG. 7 is a sectional view of a second embodiment of the present invention.

Next, a second embodiment of a spin coater according to the present invention will be explained with reference to FIG. 7. This embodiment includes multiple electric magnets 23 arranged in the circumferential direction in place of the rotating power transmitting body 18 serving as a noncontact type rotating power transmitting body in the first embodiment indicated in the FIGS. 1 to 4.

Electric current is controlled so that the direction of the magnetic fluxes of these electric magnets 23 are sequentially different in the circumferential direction, thereby making, it possible to configure a DC brushless synchronous motor between the rotating power passive body 6 and the electric magnet 23.

Therefore, a mechanical rotating mechanism such as the driving motor (FIG. 1) is not needed, so that the fixing part (operating part) 2 indicated in FIG. 1 is further miniaturized and also maintenance and repair/replacement can be made easy.

Example 3

Figure 8:
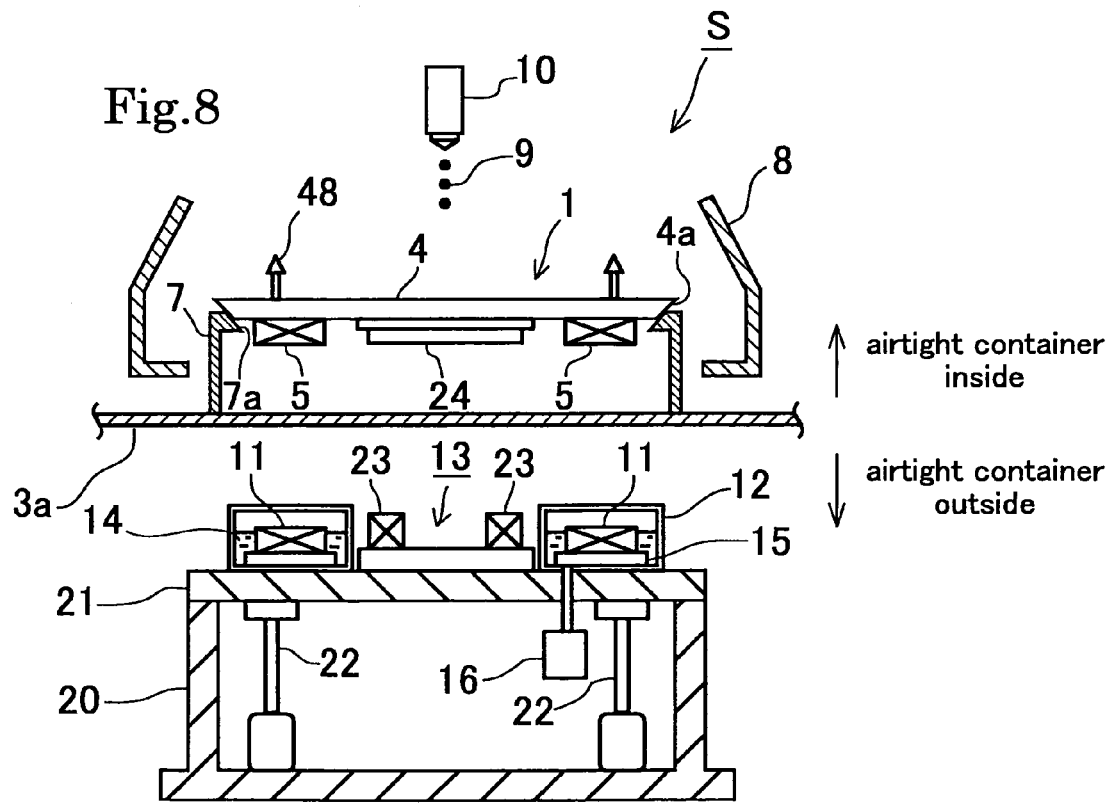
FIG. 8 is a sectional view of a third embodiment of the present invention.
Figure 9:
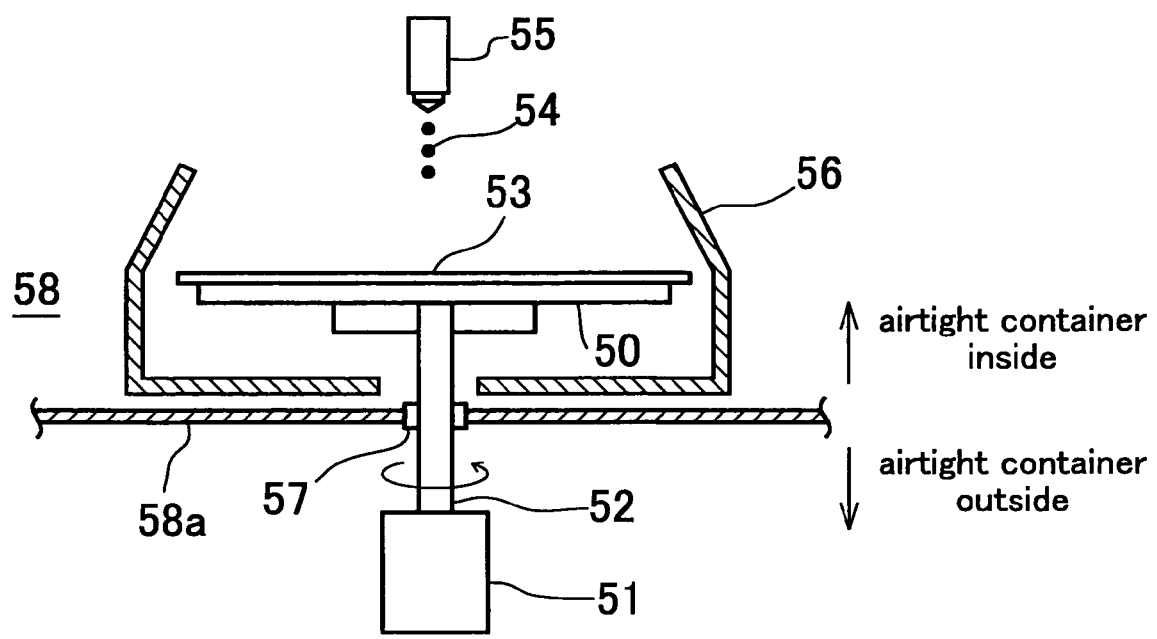
FIG. 9 is a sectional view of a conventional spin coater.

FIG. 8 indicates a third embodiment of a rotating device according to the present invention. In this embodiment, the rotating power passive body 6 serving as a noncontact type rotating power passive means in the second embodiment indicated in FIG. 7 is configured by using a discoidal electric conductive metal plate 24.

In this third embodiment, as in the above second embodiment, electric current is controlled so that the direction of the magnetic fluxes of the electric magnets 23 are sequentially different in the circumferential direction, thereby inducing eddy current to the electric conductive metal plate 24 by the magnetic field of the electric magnet 23 of the fixing part 2, and thus enabling generation of a rotating force in the rotary head part 1. Hence, the present embodiment can further simplify the structure of the rotary head part 1.

It should be noted that, although the first to third examples give, as described above, a spin coater forming a thin film on a substrate as an example, they can apply, needless to say, to another kind of substrate processing rotating device related to cleaning or drying of the substrate surface.

For example, in the first example indicated in FIG. 1, for production of a cleaning device, cleaning water may be used instead of the coating solution 9; for production of a drying device, a structure without the discharge nozzle 10 may be adopted.

A noncontact rotating processor according to the present invention is suitable for processing a thin plate-like subject to be processed at a high rotation speed in a processing step for a semiconductor substrate such as a silicon wafer, and its processing is not limited to a spin coater, but can be used for a cleaning or drying step.

For example, in the fields of study of physics and chemistry and medicine and further the field of biotechnology for a subject to be processed, the processor can be utilized for machinery used in applications like processing a subject to be processed by centrifugal force generated with high-speed rotation.

An apparatus according to the present invention is provided on condition that a subject to be processed is rotated at a high speed, and thus is particularly needed to be designed as an apparatus having means for holding a subject to be processed in consideration of balance in high speed rotation. This holding means, such as means making use of point contact such as a holding pin, or of a part of a cone face, is designed by taking into account the shape, size, weight, centrifugal force generated and the like.

In addition, the subject to be processed is not limited to a thin plate-like material. For example, a different form thereof such as a narrow glass container having put therein blood can be subjected to centrifugal processing. Such features of the apparatus can be effectively used in fields of physics and chemistry, medicine, biology and the like.

Example 4

Figure 10:
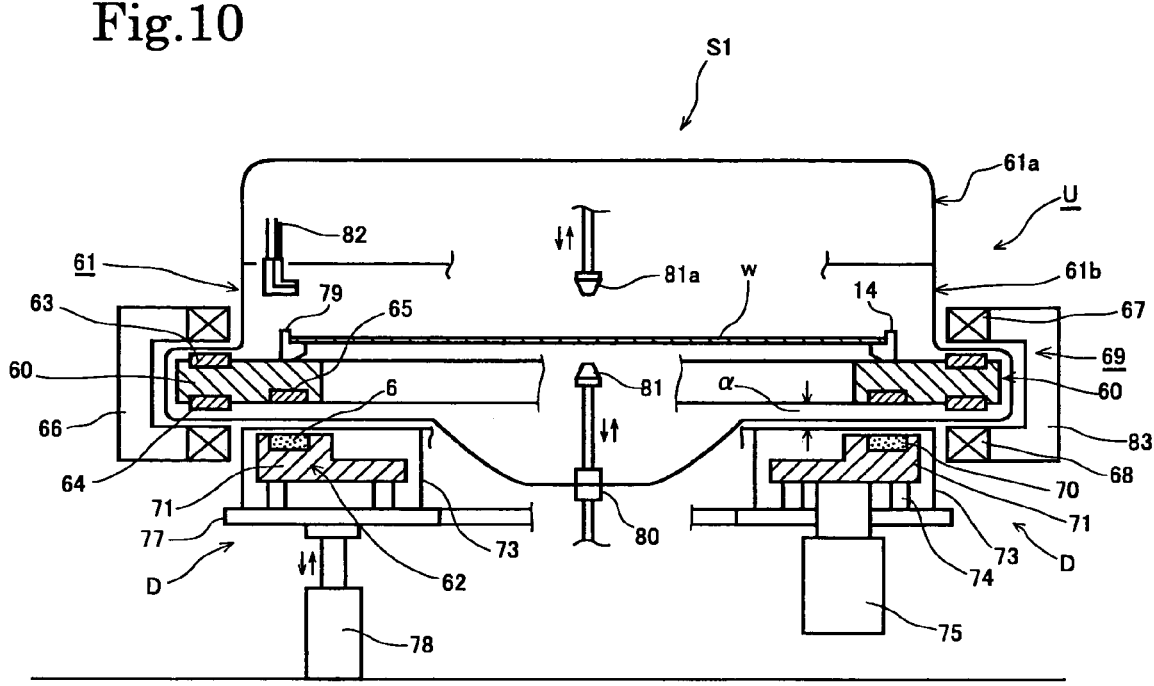
FIG. 10 is a sectional view of a fourth embodiment of the present invention.

FIG. 10 is a front sectional view indicating a main part of a noncontact rotating processor S1 that is an optimum example of a magnetic floating rotating processor according to a fourth embodiment of the present invention.

This noncontact rotating processor S1 includes a combination of a rotary head part 60 including a doughnut-shaped plate-like member having an opening (a hole) in the central part (corresponding to the rotary head part 1 of Example 1), an "upper structure U" having a part including an airtight container 61 and a "lower part structure D" having a part including, for example, a pinning member 62 having disposed therein a superconducting bulk. It should be noted that, the container 61 is configured such that a feeding port of a subject w to be processed is disposed, preferably configured to be divided into two parts, above and below, in order to insertion-mount or take out a subject w to be processed such as a semiconductor basement on the rotary plate 60.

In this example, the rotary head part 60 is formed in a doughnut shape, so that various processes such as spray treatment and injection of dry air can be carried out also to the "back face" of a wafer w of being a subject to be processed.

Figure 11:
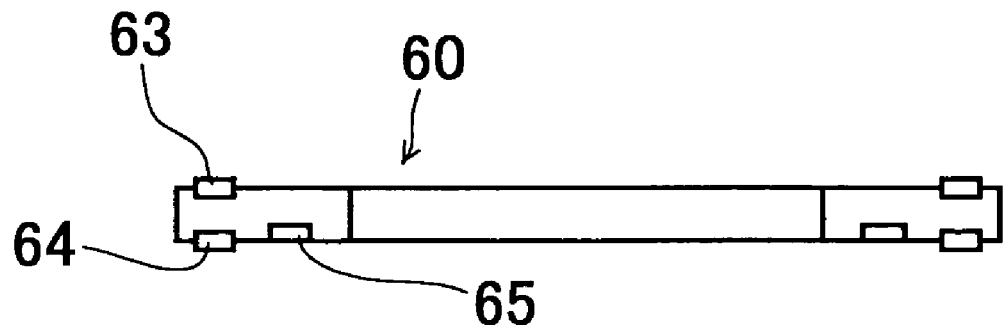
FIG. 11 is a sectional view of a rotary head of the fourth embodiment of the present invention.
Figure 12:
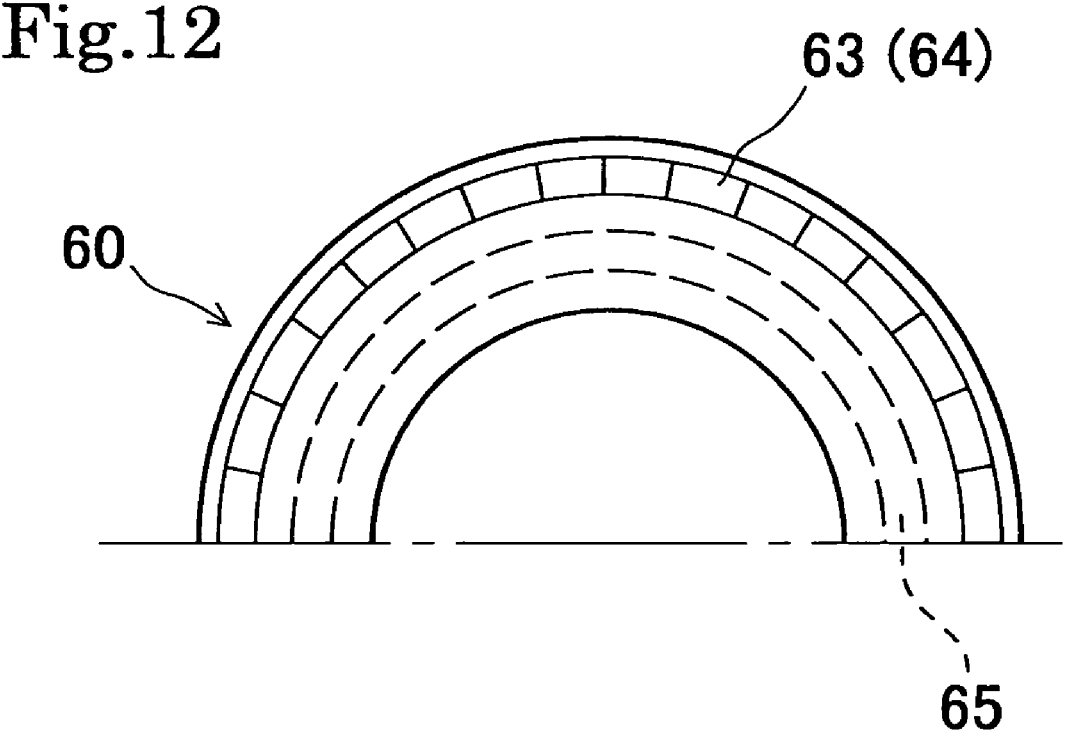
FIG. 12 is a bottom view of a rotary head of the fourth embodiment of the present invention.

The above rotary head part 60 forms a flat motor rotator in a doughnut shape as a whole in this example and can perform various processes also to the back face of the subject w to be processed using the opening part of the rotary head part 60. This rotary head 1, as illustrated in FIGS. 10 to 12, is formed by balancing a nonmagnetic material such as an aluminum alloy in a circular ring shape and formed by aligning and arranging each on its circumference a first permanent magnet 63 on its surface side, a second permanent magnet 64 on its corresponding back face and a third permanent magnet 65 on the inner peripheral side of the second permanent magnet 64.

These permanent magnets 63, 64 and 65 are formed by arranging multiple magnet fragments with different polarities on a circumference along the circumference of the rotary head part 60 and further the third permanent magnet 65 is formed by arranging one circular magnet. It should be noted that, in a fundamental configuration of an apparatus according to the present invention, although the above permanent magnets 63, 64 are used as a rotator, they can be replaced by a ferromagnetic steel plate or the like which has the same action as that of the magnet and which can also be used.

Further, rotating magnetic field coils 67, 68 by use of an iron core 66 made of a magnetic steel plate with a square bracket-shaped part pinching the periphery of the rotary head part 60 from above and below it are disposed on the peripheral face of the above rotary head part 60 relative to the first magnet 63 and second magnet 64 to make up a stator 69. Additionally, the stator 69 and the rotary head part 60 form a flat type motor by a rotator.

A lower part structure D, as shown in FIG. 10, is a device including the pinning member 62 that magnetically floats the rotary head 60 of the upper structure U at a predetermined position of the airtight container 61 by making use of a superconductor.

Figure 14:
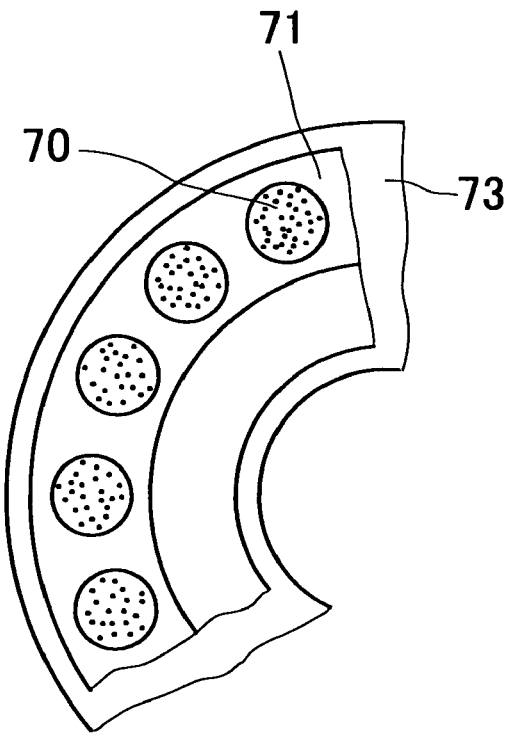
FIG. 14 is a plan view of a pinning device of the present invention.

This pinning member 62, as illustrated in FIGS. 10 and 14, is configured by arranging at predetermined intervals also a bulk 72 (a molded material of a metal powder has, in this example, a coil shape) made of a molded material of a Type-II superconductor on a cooling plate 71 produced by circularly forming a thermal conductor made of a material excellent in thermal conductivity such as copper circularly formed. It should be noted that, the bulk 72 is not a bulk molded using a powder, but can also be configured by replacing it with another in a different form.

Furthermore, this cooling plate 71 is accommodated in a plate-like circularly formed vacuum adiabatic container 73 and thermally isolated and fixed through an adiabatic block 74. Additionally, the vacuum adiabatic container 73 is connected to a vacuuming device and kept in a vacuum state.

In addition, to the above circular cooling plate 71 is connected a cooling device (freezer) 75 (FIG. 10) and the above bulk 72 is configured through the cooling plate so as to be cooled to a temperature ($-240°$ C., $30°$ K) that exhibits superconductivity.

(Upward and Downward Movement Mechanism of Pinning Device)

As shown in FIG. 10, the above vacuum adiabatic container 73 is supported by a supporter base 77 (a circular plate) and, for example, supported by an up and down moving device 78 using an air cylinder device or a servomotor to be ascent or descent. The above upward and downward moving device 78, when offering a "pinning effect," is used when the rotary head part 60 is magnetically floated and held at a predetermined position in the container 61 capable of being airtight.

On the upper face of the above rotary head part 60 is disposed a supporter 79 (preferably an adiabatic member), which is configured to support the periphery of the wafer w of being a subject to be processed or the like at multiple points.

Additionally, the container 61 is configured to be capable of being divided into a container lower part 61b and a container upper part 61a in this example and integrated. Also, a door is disposed in the side face and the subject w to be processed can also be put in or out through this door. Moreover, a lower part nozzle 81 is supported, through a seal member 80, in the center of the container lower part 61b so that the lower part nozzle 81 can move upward and downward, which is configured to feed a processing solution from the center below the wafer w or the like (transversely movable depending on a design).

Furthermore, on the container upper part 61a side is disposed an upper nozzle 81a that is movable upward and downward (or may be intruded from an oblique direction), which is configured to feed a processing solution to the upper face of the wafer w or the like. It should be noted that, reference numeral 82 indicates a robot arm automatically feeding or withdrawing the wafer w.

(Lower Part Structure of Special Shaped Container)

Figure 13:
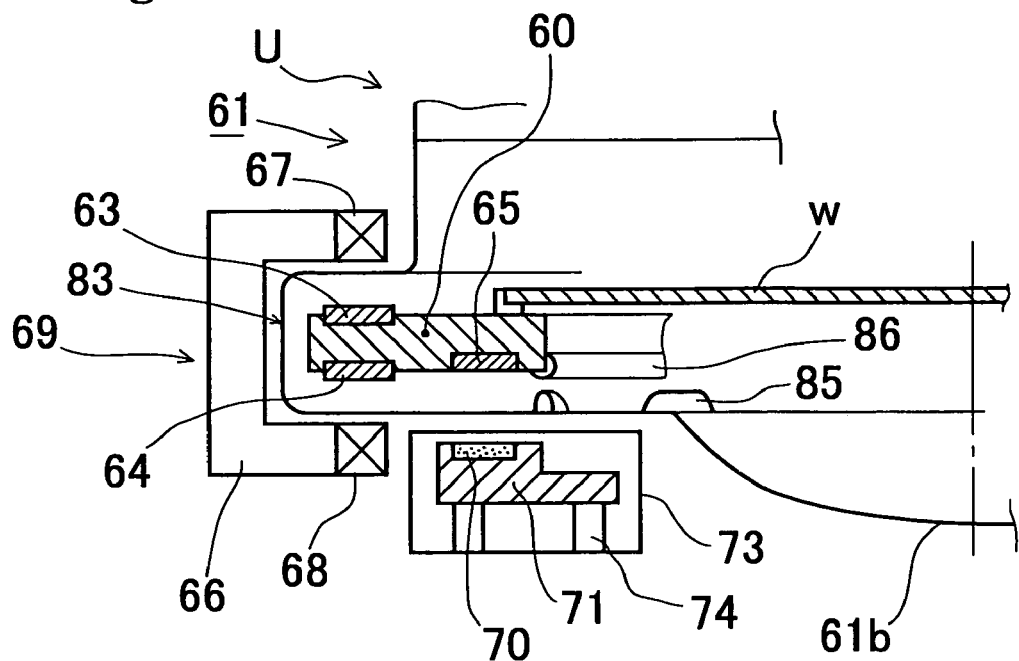
FIG. 13 is a sectional view indicating main parts of a motor mechanism and a floating device driving the rotary head of the fourth embodiment of the present invention.

In the container lower part 61b, as shown in FIG. 13, a swollen part 83 is formed in a Saturn's ring shape in the circumference direction, while an outer peripheral part of the rotary head part 60 serving as a supporter of a subject to be processed is surrounded from three directions, inside of the swollen part 83. Also, the stator 69 serving as a rotating magnetic field coil produced by providing the coils 67 and 68 to the iron core 66 made of a magnetic steel plate with a square bracket-shaped part pinching the above and below side of this swollen part 83 is formed to make up a flat type motor.

Thus, the swollen part 83 formed on the outer periphery of the container lower part 61b of the airtight container 61 is positioned so as to be opposite to, from both the faces, the permanent magnets 63, 64 (or plate materials made of a ferromagnetic material or the like) disposed on both the faces of the outer periphery part of the rotating head part 60 (rotator). Additionally, over both the faces of this swollen part 83 is arranged the stator 69 including a rotating magnetic field coil made of the above iron core 66 as well as the coils 67 and 68 to thereby constitute a flat motor using the above rotating head 60 as a rotator. It should be noted that, the shape and arrangement of the bulk 70 need not be limited to the configuration indicated FIGS. 13 and 14 so long as they are opposite to the third permanent magnet 65 disposed in the lower face of the rotary head part 60.

In this fourth embodiment, as shown in FIG. 13, as illustrated in FIG. 13, a supporter 85 is disposed on the bottom face of the swollen portion 83 formed in the container lower part 61b of the airtight container 61 and a supporter 86 opposite to and in contact with the above supporter 85 is each disposed in the lower face of the inner periphery of the circular ring-shaped rotary head part 60.

When the magnetic floating rotating processor and S1 according to the present invention is stopped in a static state where the above rotary head part 60 is not floated, the above supporters 85, 86 are made in contact with the rotary head part 60 and support the container lower part 61b. Also, when the pinning effect described below is exerted, it is configured to break off the contact between the above supporters 85 and 86 and to magnetically float the rotary head part 60.

(On Drive of Rotary Head Part 60)

When the rotary head part 60 is floated by the magnetic "pinning effect" to an intermediate position of the swollen part 83 in the container lower part 61b, a rotating magnetic field is formed by the rotating magnetic field coils 67, 68 (stators) arranged so as to pinch the parts of the permanent magnets 63, 64 (parts serving as a rotator) and also the swollen part 83 to rotate the rotary head part 60 at a predetermined rotation speed.

During the rotation of the rotary head part 60, a surface processing solution such as an etching solution or a thin film forming solution is simultaneously or separately injected from the upper nozzle 81a and the lower part nozzle 81 to subject the surface of a subject to be processed such as the wafer w supported on the rotary head part 60 to processing such as etching with the processing solution to be capable of forming a predetermined patterned semiconductor element.

The number of revolutions of the above rotary head part is from 200 to 7,000 rpm in a usual process, whereby processing is performed at a considerably high revolution. Thus, taking into account the radius and weight of this rotary head part 60, the rotary inertia energy of the rotary head part 60 is relatively large, so that it is difficult to stop the rotary head in a short time. In addition, particularly disposing a brake device in the rotary head part 60 causes the generation of dust in the vacuum airtight container 2. For this reason, it is necessary to wait until the rotary head part 60 is stopped by utilizing the air resistance.

However, in the magnetic floating rotating processor S of the present invention, the above rotator 1 itself constitutes a rotator of a motor, so that control of the electric current of the above rotating magnetic field coil 4A enables the rotating plate 1 to be quietly and rapidly stopped.

As described above, according to the magnetic floating rotating processor S related to the present invention, the outer periphery of the rotating plate 1 that supports a subject to be processed such as the wafer w and rotates is directly used as apart of an electric motor, whereby the operation of rotation and stop of the rotating plate 1 is carried out extremely precisely and efficiently, so that a process of manufacturing a semiconductor device can be performed efficiently.

Example 5

Figure 15:
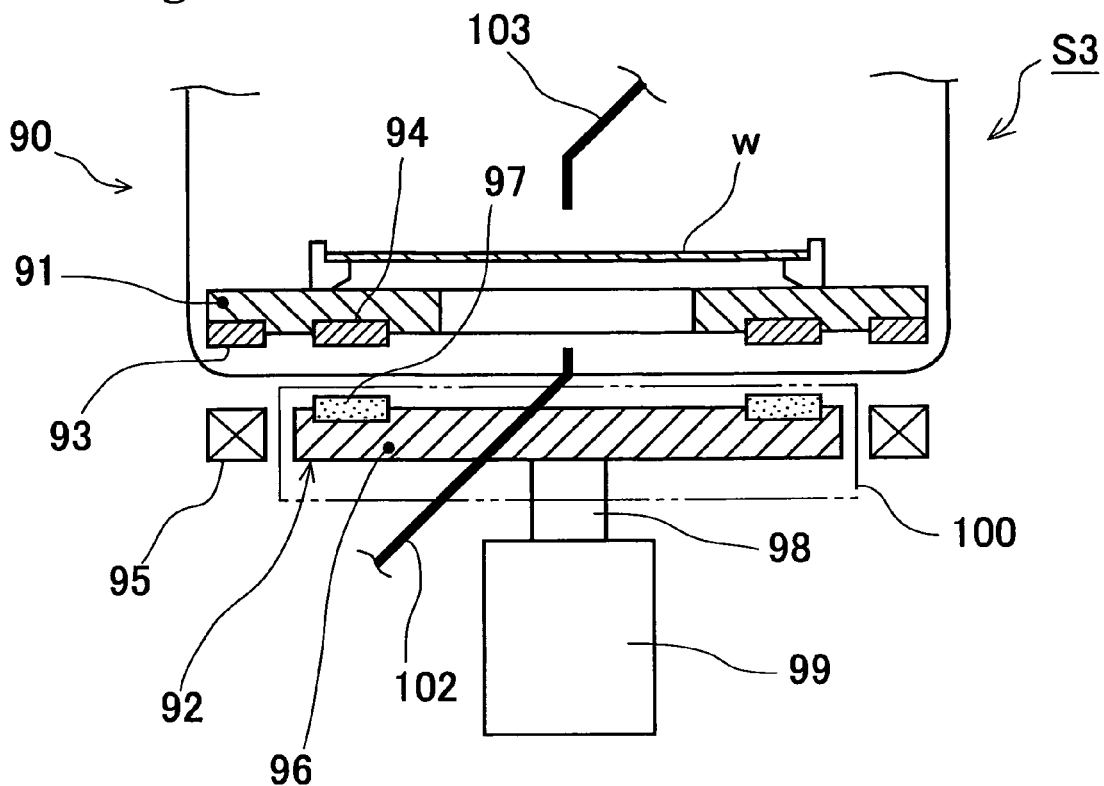
FIG. 15 is a sectional view of a main part indicating a fifth embodiment of the present invention.

FIG. 15 indicates a main part of a magnetic floating rotating processor S2 according to a fifth embodiment of the present invention. A rotary head part 91 having an opening 91a in its central part is arranged inside a container capable of being airtight and with a cylindrical peripheral face and below the container a pinning member 92 is arranged.

In addition, a rotating permanent magnet 93 is circularly disposed below the peripheral face of the rotary head part 91, and inside the permanent magnet is disposed a floating permanent magnet 94 concentrically with the above magnet 93. Also, below the above permanent magnet 93 is arranged a rotating magnetic filed coil 95, and this coil 95, the permanent magnet 93 and the rotary head part 91 make up a thin motor. It should be noted that, in the bottom face of the container 90 is disposed a supporter that supports the above rotating head part in a stationary state, but this illustration is omitted.

Figure 5:
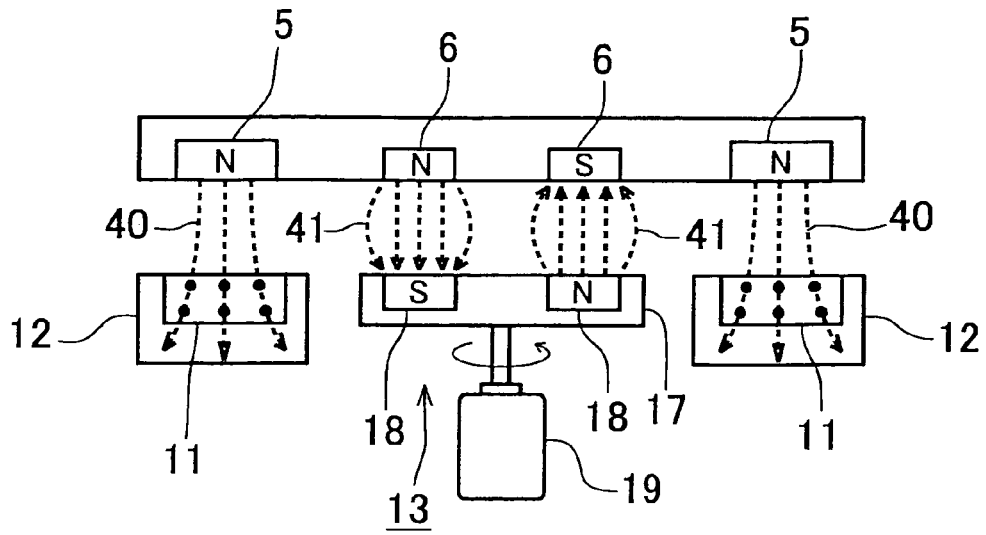
FIG. 5 is a schematic diagram indicating the principle of rotation.

The pinning member 92 has arranged therein at predetermined intervals a bulk 97 (a superconductor) that is produced by forming a Type-II superconductor in a coin shape, as shown in FIG. 5, in the upper face of a heat transfer plate 27 produced by discoidally forming a good heat conductivity metal material, for example, copper, is connected to a freezer 99 through a heat conductive column 98 on the back face of the pinning member and cools the bulk 97 to a supper low temperature to offer superconductivity.

The above pinning member 92 is entirely accommodated in a vacuum container 100 for an adiabatic effect and further the inside of the container is kept in a super low temperature state. Additionally, a lower part nozzle 102 is disposed through the heat transfer plate 92, vacuum container 33 and airtight container 90. Moreover, an upper nozzle 103 is also disposed above the rotary head part 91.

The magnetic floating rotating processor S3 having the above configuration needs a structure that makes the bottom of the airtight container 90 support the rotary head part 91 and a mechanism that makes the above pinning member 92 move upward and downward in order to exert the pinning effect; however, these structures can make use of a device adopted in the Example 1 or a device having improved it.

In this Example 5, since the rotating permanent magnet 93 for a flat motor and the rotating magnetic field coil 95 are arranged opposite to each other in the periphery of the bottom of the airtight container 90, the structure of the airtight container 61 can be simplified without forming the swollen part 83 formed in the lower part of the container 61 capable of being airtight illustrated in FIG. 13.

Example 6

Figure 16:
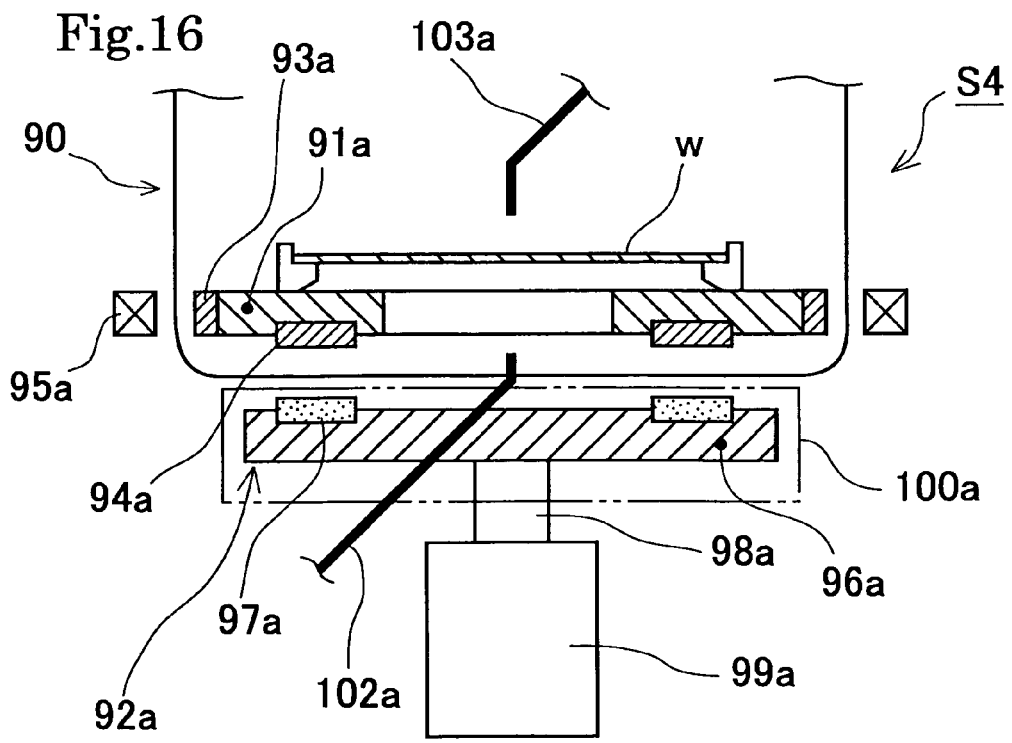
FIG. 16 is a sectional view of a main part indicating a sixth embodiment of the present invention.

FIG. 16 illustrates a main part of the magnetic floating rotating processor S3 according to a sixth example of the present invention and this apparatus is one a part of which is modified in the structure of S2 of the fifth example indicated in the FIG. 15. In this sixth example, the permanent magnet 93 and the rotating magnetic field coil 95 making up the flat driving part illustrated in FIG. 15 are made opposite to each other in the bottom of the container 90 capable of being airtight; on the other hand, in this fifth embodiment, they are made opposite to each other in the peripheral wall of the bottom of the container 90.

For the device S2 illustrated in the FIG. 15, magnetic force generated between the permanent magnet 93 and the rotating magnetic field coil 95 acts on a direction in which the above floating magnetic force is weakened by floating force of a rotary head part 91a, or in other words, acts on the longitudinal direction, relative to the floating magnetic force of the rotary head part 91. However, the case of the device S4 of the fifth example is excellent in that magnetic force is generated in the circumferential direction of the rotary head part 91a, so that magnetic force in which the rotating magnetic field coil 95a acts on the rotary head part 91a does not act on a direction in which floating magnetic force generating between a bulk 97a of a pinning member in the vacuum container 100a and a magnet 94a is weakened.

Example 7

FIGS. 17 to 20 illustrate a seventh example and indicate a series of apparatuses that performs continuous processes by arranging the noncontact rotating processors S4 in multiple numbers.

In the rotating processor S4 of this example, a rotary head part 111 with an opening part 111a in its central part and is mounted on an unillustrated supporter. Additionally, a subject w to be processed such as a semiconductor substrate or a glass substrate is supported on a supporter 111b disposed on the rotary head part 111.

Moreover, as a lower part structure, a pinning member 112 (herein, generally refers to floating means for the above rotary head part 111) is liftably supported by an up and down moving device 113. In addition, a rotating power conductor 114 having a permanent magnet 114a on its supporter, a permanent magnet 114b disposed opposite to a permanent magnet 111c disposed in the back face of the above rotary head part 111, and the like make up a magnetic driving body and a magnetic passive body (i.e., a magnetic coupling).

Additionally, the above rotary head part 111 is floated by superconductive action in the above container 110 and rotated by utilization of the above magnetic driving body and a detailed configuration is as described above.

Furthermore, by disposition of a gap G between the permanent magnet 114a making up a magnetic driving body and the upper face of a vacuum container 112a making up the pinning member 112, the movement of the magnetic driving body 114 is made easy. In addition, it is configured such that the upper face of the vacuum container 112a of the pinning member 112 is in tight contact with the bottom of the container, thereby stably holding the container 110.

Figure 18:
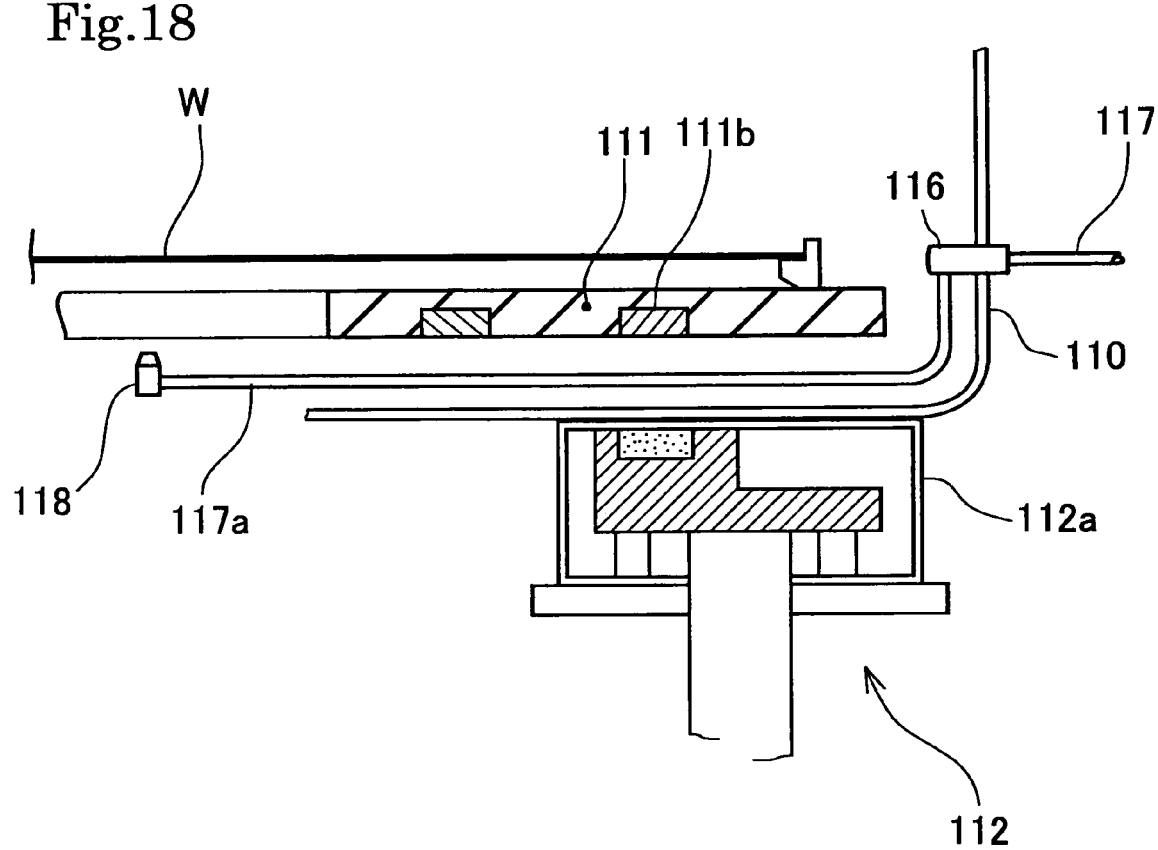
FIG. 18 is a sectional view of a main part indicating a seventh embodiment of the present invention.

FIG. 18 illustrates a device that processes the back face of the subject w to be processed such as a semiconductor substrate or a glass substrate by injecting a processing solution or a processing gas by means of a nozzle from below the opening 111a of the central part of the rotary head part 111. An external pipe 114 and an internal pipe 114a are disposed through a connecting tool 116 (a kind of coupling) disposed in the side wall of the container 110 and a nozzle 115 is dispose at the tip of the pipe 117a.

Figure 17:
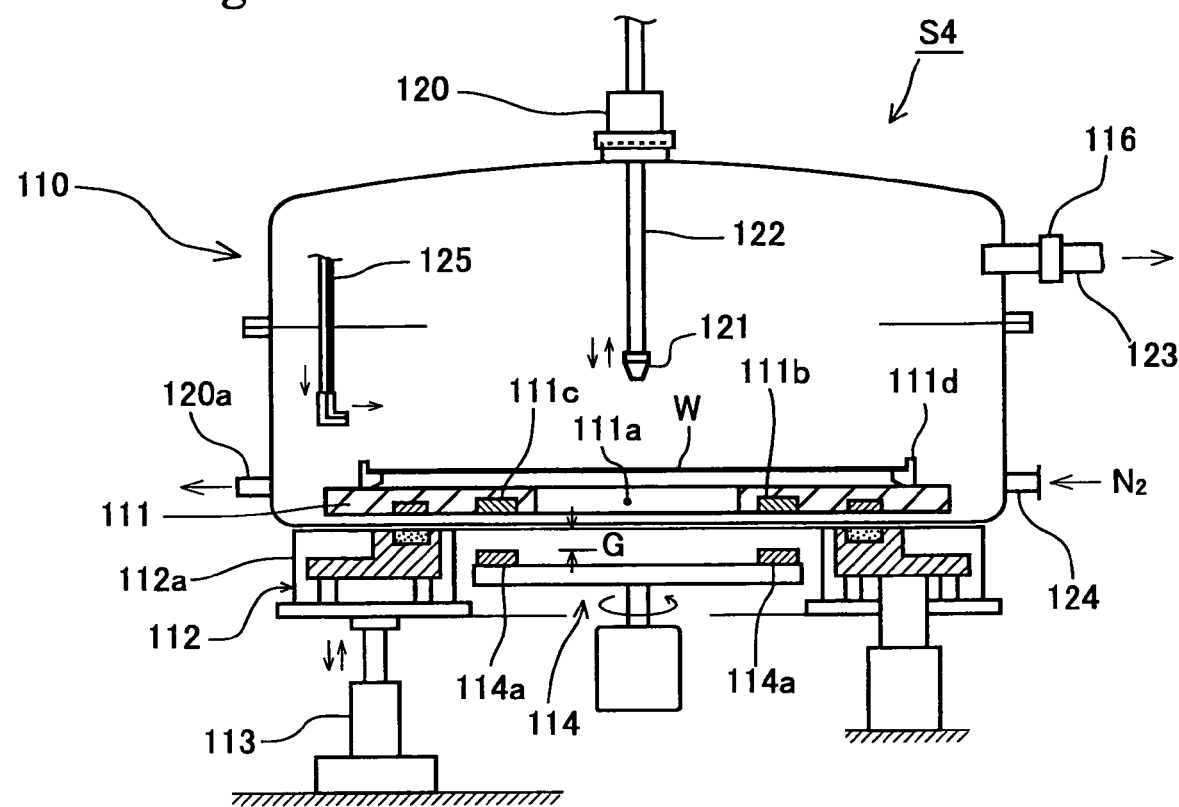
FIG. 17 is a sectional view indicating a seventh embodiment of the present invention.

As shown in FIG. 17, in the central part of the ceiling of the container 110, a nozzle tube 122 having a nozzle 121 at its tip is supported upward and downward movably and in a sealed state relative to the upper structure through a connecting tool 120. In addition, in the container are disposed an exhaust pipe 123, nitrogen gas feeding and discharging tubes 124, 120a, and further a robot arm 125 that brings in and takes out the subject w to be processed while holding it.

The above connecting tool 120 is constructed so as to install therein a nozzle tube that feeds a coating solution or etching solution, or drying air in each of the other steps in respective steps.

Figure 19:
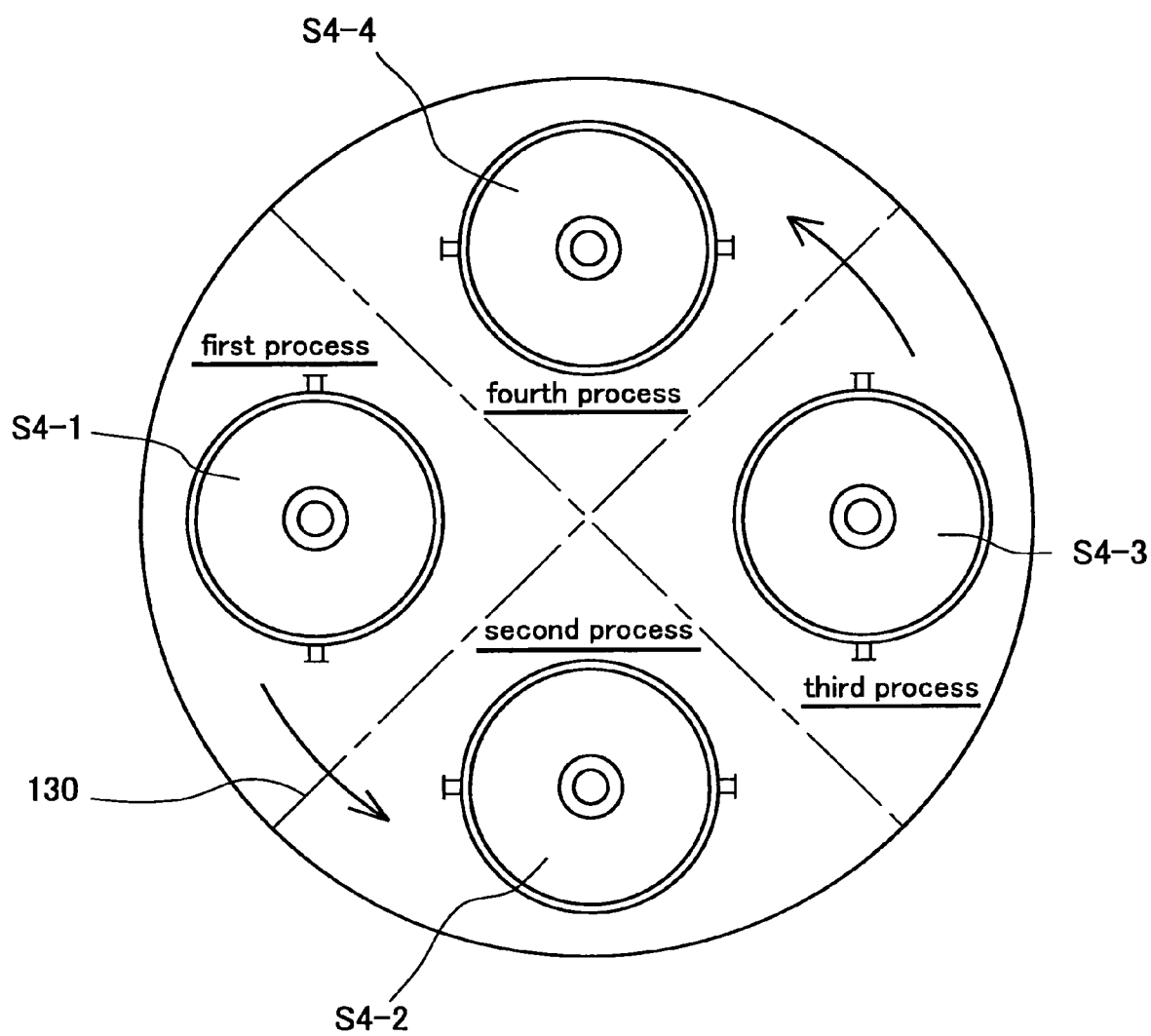
FIG. 19 is a plan view of a continuous processor of the present invention.

FIG. 19 illustrates equipment in which the rotating processor S4 indicated in the FIG. 17, e.g., four units (S4-1, S4-2, S4-3 and S4-4) in this case, are disposed on a rotating base and in which this rotating base is subjected to 90° rotation so as to carry out continuous processing from first to fourth steps.

Figure 20:
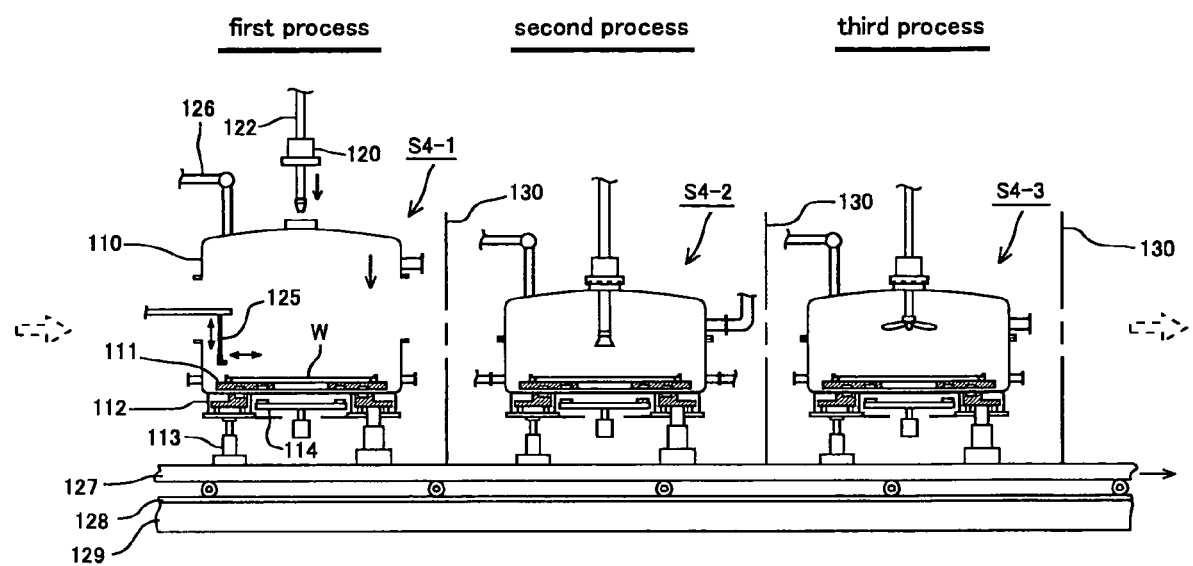
FIG. 20 is a side sectional view of a continuous processor of the present invention.

FIG. 20 illustrates a system that can entail placing a rail on a base plate 127, guiding movably the above base plate 127 (rotating plate) by use of a rail 128, arranging and fixing four rotating processors S4 onto the base plate 127 at predetermined intervals, rotating the above base plate 127 by an unillustrated driving device and stopping the base plate at a predetermined stop position, and then carrying out next processing.

For instance, the rotating processor S1-1 is set to a first step, the upper structure of the container 110 is moved and opened to introduce thereinto the subject w to be processed and mount the material on the rotary head 111 by a robot arm. Next, the upper structure of the above opened container 110 is brought down on the lower structure, and then the separated nozzle tube 122 is lifted down inside the container at an opening to which the connecting tool 120 of the upper structure is fixed. Thereafter, the nozzle tubes are connected and then the nozzle tube 122 is moved to a predetermined position. Upon the completion of the first step S4-1, the base plate 127 is rotated by a predetermined angle, the rotating processor S4 is moved to a position of a second step S4-2, where predetermined processing is implemented. The second step A4-2 is, for example, a cooling step, a third step S4-3 is, for example, a drying step, or the like.

As described above, a series of rotary processes can be efficiently carried out by preparing the rotating processors S4 having a predetermined function in multiple numbers, placing the processors on a rotating plate as explained above or housing the processors in a predetermined container and performing predetermined processing at each position.

The processor is also applicable to a floating rotating processor for a semiconductor substrate and chemical equipment that performs a centrifugal operation at a high rotation speed.

What is claimed is:

1. A noncontact rotating processor characterized by comprising:
   a container;
   a discoidal rotary head part that rotates with a subject to be processed mounted thereon, and that is accommodated in the container;
   means for magnetically transmitting rotating power, the means for magnetically transmitting rotating power being arranged below the container so as to be opposite to the rotary head part in non-contact therewith; and
   a magnetically fixing part which concentrically encloses the means for magnetically transmitting rotating power, and which magnetically positions the rotary head part in a predetermined position thereabove,
   the noncontact rotating processor characterized in that
   the rotary head part includes: a magnetically receiving means which receives rotating force; and a ring-shaped permanent magnet concentrically enclosing the magnetically receiving means, and
   the magnetically fixing part includes: a pinning member formed of a Type-II superconductor concentrically arranged opposite to the ring-shaped permanent magnet; and cooling means for cooling the pinning member, and further, is provided with lifting means for lifting the pinning members.

2. The noncontact rotating processor according to claim 1, characterized in that
   a holder that holds the rotary head part is disposed on the inner face of the floor wall of the container.

3. A noncontact rotating processor characterized by comprising:
   a container;
   a discoidal rotary head part that rotates with a subject to be processed mounted thereon and has an opening in its central part, the discoidal rotary head part being accommodated in the container;
   a floating permanent magnet disposed on the lower face of the rotary head part;
   one of a rotating permanent magnet and a ferromagnetic steel plate that is disposed on any one of the outer periphery, and the lower face of the inner peripheral side, of the magnet;
   a Type-II superconductor circularly arranged in a position opposite to the floating permanent magnet; and
   means for magnetically transmitting rotating power arranged in a position opposite to the one of the rotating permanent magnet and the ferromagnetic steel plate in non-contact therewith, the noncontact rotating processor characterized in that the rotary head part is rotationally driven in a non-contact state.

4. A noncontact rotating processor characterized by comprising:
   a container;
   a discoidal rotary head part that rotates with a subject to be processed mounted thereon and has an opening in its central part, the discoidal rotary head part being accommodated in the container;
   a floating permanent magnet that is disposed on the lower face of the rotary head part as well as one of a rotating permanent magnet and a ferromagnetic steel plate that is disposed on both faces of an outer peripheral part of the permanent magnet and an upper face corresponding to the outer peripheral part;
   a rotating magnetic field coil that is arranged to pinch, from above and below, the one of the rotating permanent magnet and the ferromagnetic steel plate;
   a Type-II superconductor circularly arranged so as to correspond to the floating permanent magnet,
   the noncontact rotating processor characterized in that
   the rotary head part is rotationally driven in a non-contact state by: the one of the permanent magnet and the ferromagnetic steel plate disposed on both faces of the outer periphery of the rotary head part; and the rotating magnetic field coil disposed so as to correspond to the one of the permanent magnet and the ferromagnetic steel plate.

5. The noncontact rotating processor according to claim 4, characterized in that
   a part of the outer periphery of the container is circularly swollen,
   an outer peripheral part of the rotary head part having an opening in the central part is arranged in the swollen part, and
   the rotating magnetic field coil is arranged so as to pinch the swollen part from above and below.

6. A noncontact rotating processor characterized by comprising:
   a container;
   a discoidal rotary head part that rotates with a subject to be processed mounted thereon and has an opening in its central part, the discoidal rotary head being accommodated in the container;
   a floating permanent magnet disposed on the lower face of the head part;
   one of a rotating permanent magnet and a ferromagnetic steel plate disposed on the outer peripheral side of the rotary head part;
   a rotating magnetic field coil arranged on the bottom part of the container in a position opposite to the one of the magnet and the ferromagnetic steel plate,
   the noncontact rotating processor characterized in that the rotary head is rotationally driven by means of the one of the permanent magnet and the ferromagnetic steel plate.

7. A continuous noncontact rotating processor characterized by comprising:
   a moving device; and
   a plurality of the noncontact rotating processors arranged on the moving device, each of said noncontact rotating processors comprising:
      a container,
      a discoidal rotary head part that rotates with a subject to be processed mounted thereon, and that is accommodated in the container,
      means for magnetically transmitting rotating power, the means for magnetically transmitting rotating power being arranged below the container so as to be opposite to the rotary head part in non-contact therewith, and
      a magnetically fixing part which concentrically encloses the means for magnetically transmitting rotating power, and which magnetically positions the rotary head part in a predetermined position thereabove,
      the noncontact rotating processor characterized in that
      the rotary head part includes: a magnetically receiving means which receives rotating force, and a ring-shaped permanent magnet concentrically enclosing the magnetically receiving means, and the magnetically fixing part includes: a pinning member formed of a Type-II superconductor concentrically arranged opposite to the ring-shaped permanent magnet, and cooling means for cooling the pinning member, and further, is provided with lifting means for lifting the pinning members;

the continuous noncontact rotating processor characterized in that the moving device is moved and then stopped at a predetermined position, and thereafter, a plurality of processes are sequentially implemented at the stop position.

8. The continuous noncontact rotating processor according to claim 7, characterized in that
a holder that holds the rotary head part of each of said noncontact rotating processor is disposed on the inner face of the floor wall of the container.

9. A continuous noncontact rotating processor characterized by comprising:
a moving device; and
a plurality of the noncontact rotating processors arranged on the moving device, each of said noncontact rotating processors comprising:
a container,
a discoidal rotary head part that rotates with a subject to be processed mounted thereon and has an opening in its central part, the discoidal rotary head part being accommodated in the container,
a floating permanent magnet disposed on the lower face of the rotary head part,
one of a rotating permanent magnet and a ferromagnetic steel plate that is disposed on any one of the outer periphery, and the lower face of the inner peripheral side, of the magnet,
a Type-II superconductor circularly arranged in a position opposite to the floating permanent magnet, and
means for magnetically transmitting rotating power arranged in a position opposite to the one of the rotating permanent magnet and the ferromagnetic steel plate in non-contact therewith,
the noncontact rotating processor characterized in that the rotary head part is rotationally driven in a non-contact state;
the continuous noncontact rotating processor characterized in that the moving device is moved and then stopped at a predetermined position, and thereafter, a plurality of processes are sequentially implemented at the stop position.

10. A continuous noncontact rotating processor characterized by comprising:
a moving device; and
a plurality of the noncontact rotating processors arranged on the moving device, each of said noncontact rotating processors comprising:
a container,
a discoidal rotary head part that rotates with a subject to be processed mounted thereon and has an opening in its central part, the discoidal rotary head part being accommodated in the container,
a floating permanent magnet that is disposed on the lower face of the rotary head part as well as one of a rotating permanent magnet and a ferromagnetic steel plate that is disposed on both faces of an outer peripheral part of the permanent magnet and an upper face corresponding to the outer peripheral part,
a rotating magnetic field coil that is arranged to pinch, from above and below, the one of the rotating permanent magnet and the ferromagnetic steel plate,
a Type-II superconductor circularly arranged so as to correspond to the floating permanent magnet,
the noncontact rotating processor characterized in that the rotary head part is rotationally driven in a non-contact state by: the one of the permanent magnet and the ferromagnetic steel plate disposed on both faces of the outer periphery of the rotary head part, and the rotating magnetic field coil disposed so as to correspond to the one of the permanent magnet and the ferromagnetic steel plate;
the continuous noncontact rotating processor characterized in that the moving device is moved and then stopped at a predetermined position, and thereafter, a plurality of processes are sequentially implemented at the stop position.

11. The continuous noncontact rotating processor according to claim 10, characterized in that:
a part of the outer periphery of the container of each of the noncontact rotating processors is circularly swollen,
an outer peripheral part of the rotary head part having an opening in the central part is arranged in the swollen part, and
the rotating magnetic field coil is arranged so as to pinch the swollen part from above and below.

* * * * *